United States Patent
Battiato et al.

(10) Patent No.: US 12,438,225 B2
(45) Date of Patent: Oct. 7, 2025

(54) BATTERY ASSEMBLIES, MOTOR VEHICLES, AND METHODS FIXTURING BATTERY COMPONENTS UTILIZING FAST-SET ADHESIVES

(71) Applicant: GM GLOBAL TECHNOLOGY OPERATIONS LLC, Detroit, MI (US)

(72) Inventors: Jason Battiato, Washington, MI (US); Kenneth C. Hickey, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 454 days.

(21) Appl. No.: 18/096,215

(22) Filed: Jan. 12, 2023

(65) Prior Publication Data

US 2024/0243415 A1    Jul. 18, 2024

(51) Int. Cl.
*H01M 50/289* (2021.01)
*B60K 1/04* (2019.01)
(Continued)

(52) U.S. Cl.
CPC ............ *H01M 50/289* (2021.01); *B60K 1/04* (2013.01); *H01M 50/204* (2021.01); *H01M 50/502* (2021.01); *H01M 2220/20* (2013.01)

(58) Field of Classification Search
CPC . H01M 50/289; H01M 50/502; H01M 50/204
See application file for complete search history.

(56) References Cited

U.S. PATENT DOCUMENTS

| | | | |
|---|---|---|---|
| 3,415,715 A | * | 12/1968 | Gorcom ................ B32B 27/00 525/123 |
| 8,236,067 B2 | | 8/2012 | Rober et al. |
| (Continued) | | | |

FOREIGN PATENT DOCUMENTS

| | | | | |
|---|---|---|---|---|
| CN | 104319362 A | * | 1/2015 | .......... H01M 50/531 |
| DE | 2008104376 A1 | | 9/2008 | |
| WO | WO-2015145517 A1 | * | 10/2015 | .......... H01M 50/213 |

OTHER PUBLICATIONS

Machine Translation of CN-104319362-A (Jul. 9, 2025) (Year: 2025).*

*Primary Examiner* — Matthew J Merkling
(74) *Attorney, Agent, or Firm* — Quinn IP Law (57) ABSTRACT

Presented are battery assemblies containing adhesives fixturing internal battery components, methods for making/using such battery assemblies, and vehicles with battery packs securing battery cells inside a pack housing using fast-setting and slow-curing adhesives. A battery assembly includes multiple battery cells disposed inside a protective battery housing. Top and bottom shear plates, which are attached to opposing sides of the battery housing, sandwich therebetween the battery cells. A first adhesive layer, which is disposed between the cells and the top shear plate, includes a first adhesive having a first chemical composition with a first curing time, and a second adhesive having a second chemical composition, distinct from the first chemical composition, with a second curing time, faster than the first curing time. A second adhesive layer is disposed between the cells and the top or bottom shear plate, spaced from the first adhesive layer, and includes the first and second adhesives.

20 Claims, 4 Drawing Sheets

(51) Int. Cl.
*H01M 50/204* (2021.01)
*H01M 50/502* (2021.01)

(56) References Cited

U.S. PATENT DOCUMENTS

| | | |
|---|---|---|
| 8,950,536 B2 | 2/2015 | Maguire et al. |
| 9,236,592 B2 | 1/2016 | Sundararajan et al. |
| 10,622,684 B2 | 4/2020 | Koch et al. |
| 10,868,286 B2 | 12/2020 | Hofer et al. |
| 12,148,901 B2 * | 11/2024 | Cournoyer ............ H01M 10/54 |
| 2009/0297892 A1 | 12/2009 | Morisawa et al. |
| 2015/0111010 A1 * | 4/2015 | Nash .......................... C09J 7/35 |
| | | 428/200 |
| 2016/0301117 A1 * | 10/2016 | Tyler ................. H01M 10/0525 |
| 2017/0365888 A1 * | 12/2017 | Kwon ................ H01M 10/4207 |
| 2020/0358051 A1 * | 11/2020 | Dawley .................. B60L 50/64 |
| 2022/0059810 A1 * | 2/2022 | Cournoyer .......... H01M 50/293 |
| 2022/0093901 A1 * | 3/2022 | Cournoyer ........ H01M 10/0404 |
| 2022/0166097 A1 * | 5/2022 | Kim .................... H01M 50/211 |

\* cited by examiner

BATTERY ASSEMBLIES, MOTOR VEHICLES, AND METHODS FIXTURING BATTERY COMPONENTS UTILIZING FAST-SET ADHESIVES

INTRODUCTION

The present disclosure relates generally to electrochemical devices for generating electrical power. More specifically, aspects of this disclosure relate to systems, methods, and devices for securely mounting battery components inside battery housings.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

A full-electric vehicle (FEV)—colloquially labeled an "electric car"—is a type of electric-drive vehicle configuration that altogether omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with a single or multiple traction motors, rechargeable battery cells, and battery cooling and charging hardware in a battery-based FEV. Hybrid-electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

High-voltage (HV) electrical systems govern the transfer of electricity between the traction motors and the rechargeable battery packs that supply the requisite power for operating many hybrid-electric and full-electric powertrains. To provide the power capacity and energy density needed to propel a vehicle at desired speeds for desired ranges, contemporary traction battery packs group multiple battery cells (e.g., 8-16+ cells/stack) into individual battery modules (e.g., 10-40+ modules/pack) that are electrically interconnected in series or parallel and mounted onto the vehicle chassis, e.g., by a battery pack housing or support tray. Located on a battery side of the HV electric system is a front-end DC-to-DC power converter that is electrically connected to the traction battery pack(s) in order to increase the supply of voltage to a main DC bus and a DC-to-AC power inverter module (PIM). Arranged across the positive and negative terminals of the main DC bus is a high-frequency bulk capacitor that provides electrical stability and stores supplemental electrical energy. A dedicated Electronic Battery Control Module (EBCM), through collaborative operation with a Powertrain Control Module (PCM) and each motor's power electronics package, governs operation of the battery pack(s) and traction motor(s).

There are four primary types of batteries that are used in modern electric-drive vehicles: lithium-class batteries, nickel-metal hydride batteries, ultracapacitor batteries, and lead-acid batteries. As per lithium-class designs, lithium-metal and lithium-ion (secondary) batteries make up the bulk of commercial lithium battery (LiB) configurations in automotive applications due to their enhanced stability, energy density, and rechargeable capabilities. A standard lithium-ion cell is generally composed of an ion-conducting electrolyte material, at least one pair of working electrodes, and a permeable separator, all of which are enclosed inside an electrically insulated packaging, such as a cell pouch, cylindrical can, or prismatic shell. One electrode serves as a positive ("cathode") electrode and the other electrode serves as a negative ("anode") electrode during cell discharge. Rechargeable Li-ion batteries operate by reversibly passing lithium ions back and forth through the separator and between the negative and positive electrodes. During battery pack assembly, the individual cells are securely fixed in place to minimize cell vibrations and rattling noises as well as to prolong cell service life during pack use. Typically, a rigid cell fixture employs mechanical fasteners or cell receptacles to hold the cells in place during battery assembly to facilitate alignment and mounting of the cells inside the pack housing and electrical interconnection of the cells.

SUMMARY

Presented herein are battery assemblies employing adhesives for fixturing battery components, methods for making and methods for using such battery assemblies, and electric-drive vehicles with battery packs securing battery cells inside a pack housing using both fast-set and slow-cure adhesives. In an example, a rechargeable traction battery pack contains an array of lithium-class cylindrical battery cells. The cell array may be sandwiched between an electrical interconnect board (ICB) assembly and a cell support tray, which are in turn sandwiched between top and bottom shear plates. During pack assembly, an intricate pattern of adhesives is dispensed by applying a fast-set (secondary) adhesive in conjunction with a slow-curing (primary) adhesive to facilitate cell alignment, attachment and connectivity. The primary adhesive is oftentimes selected to meet the system's structural integrity requirements and noise, vibration and harshness (NVH) thresholds; however, the primary adhesive's curing time may far exceed the manufacturing cycle times in each dispense station. Rather than use costly and time-intensive fixtures or mechanical fasteners to locate the cells, tray, and ICB inside the pack housing, a fast-setting adhesive is used to fixture these components as the primary adhesive cures.

To ensure that the battery components are securely fixtured during the pack manufacturing process, the fast-set adhesive may be applied in a predefined adhesive pattern on a predetermined optimal surface area of the support tray and ICB. The adhesive pattern and surface area may be engineered to identify an optimal ratio of primary adhesive to secondary adhesive. Moreover, the optimal ratio and the individual chemical compositions of the adhesives may be selected based on a predefined minimum fixture strength, the battery system geometry, and the manufacturing processes that take place during curing of the primary adhesive. Both the primary and secondary adhesives may be applied to only select locations in predetermined patterns on the cells, cell tray, ICB, etc. The fast-set adhesive may be dispensed after and in adjoining, direct physical contact with the primary adhesive. After the battery cells are seated on the support tray and the fast-set adhesive achieves green strength, additional manufacturing processes are carried out while the primary adhesive cures.

Attendant benefits for at least some disclosed concepts include battery assembly architectures employing fast-set adhesives for fixturing battery components to enable increased volumes of primary adhesives with longer working times for pack assembly. Other benefits may include the ability to select the battery pack's primary structural adhesive based on the adhesive's performance characteristics rather than the adhesive's handling and cure times. Disclosed features may also help to minimize cure wait times with a concomitant reduction in manufacturing cycle times and to eliminate the use of cell fixtures with a concomitant reduction in manufacturing tooling costs and fixturing times.

Aspects of this disclosure are directed to multilayer, multi-adhesive compositions for fixturing battery components of battery assemblies, including both automotive and non-automotive applications alike. In an example, there is presented a battery assembly, which may be in the nature of a rechargeable battery pack for powering an electrified powertrain of an electric-drive motor vehicle. The battery assembly includes a protective outer housing that encloses therein a plurality of battery cells, such as a rectangular-array of lithium-class cylindrical (secondary) battery cells. Top (first) and bottom (second) rigid shear plates are respectively attached to top (first) and bottom (second) sides of the battery housing, sandwiching therebetween the battery cells. Disposed between the battery cells and the top (first) shear plate is an initial (first) layer of adhesives that includes both a primary (first) adhesive having a chemical composition with a slow (first) curing time and a fixturing (second) adhesive having a distinct chemical composition with a fast (second) curing time. An additional (second) layer of adhesives is disposed between the battery cells and the top or bottom shear plate, spaced from the initial layer of adhesives, and likewise includes both the primary and secondary adhesives.

Additional aspects of this disclosure are directed to motor vehicles with rechargeable battery packs securing battery cells inside a pack housing using both fast-set and slow-cure adhesives. As used herein, the terms "vehicle" and "motor vehicle" may be used interchangeably and synonymously to include any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles, motorcycles, farm equipment, watercraft, aircraft, e-bikes, etc. For non-automotive applications, disclosed concepts may be implemented for any logically relevant use, including stand-alone power stations and portable power packs, wind farms, photovoltaic systems, pumping equipment, machine tools, server systems, etc. While not per se limited, disclosed concepts may be particularly advantageous for use with lithium-class prismatic and cylindrical battery cells.

In an example, a motor vehicle includes a vehicle body with a passenger compartment, multiple road wheels mounted to the vehicle body (e.g., via corner modules coupled to a unibody or body-on-frame chassis), and other standard original equipment. For electric-drive vehicle applications, one or more electric traction motors operate alone (e.g., for FEV powertrains) or in conjunction with an internal combustion engine assembly (e.g., for HEV powertrains) to drive one or more of the road wheels and thereby propel the vehicle. A rechargeable traction battery pack is mounted onto the vehicle body and operable to power the traction motor(s).

Continuing with the preceding discussion, the vehicle's traction battery pack includes a protective battery housing that contains multiple cylindrical, lithium-class battery cells. A rigid top shear plate is attached to a top side of the housing and a rigid bottom shear plate is attached to a bottom side of the housing such that the battery cells are interposed between the two shear plates. An electrical interconnect board, which is disposed in the battery housing proximal the top shear plate, electrically interconnects the battery cells to one another and a pack bus. Disposed inside the battery housing proximal the bottom shear plate is a cell holder tray that supports thereon the battery cells. An initial adhesive layer abuts the battery cells, is disposed between the top shear plate and the battery cells, and includes both a primary adhesive having a medium or high-strength chemical composition with a slow curing time, and a secondary adhesive having a low or medium-strength chemical composition with a fast curing time. Another adhesive layer is disposed between the battery cells and the top (or bottom) shear plate, is spaced from the first adhesive layer, and includes both the primary and secondary adhesives.

Aspects of this disclosure are also directed to manufacturing workflow processes, computer-readable media, and control logic for making or for using any of the disclosed adhesive arrangements, battery assemblies, and/or motor vehicles. In an example, a method is presented for constructing a battery assembly. This representative method includes, in any order and in any combination with any of the above and below disclosed options and features: receiving a battery housing; placing a plurality of battery cells inside the battery housing; attaching first and second shear plates to opposing first and second housing sides, respectively, of the battery housing such that the first and second shear plates sandwich therebetween the battery cells; disposing a first adhesive layer between the battery cells and the first shear plate, the first adhesive layer including a first adhesive having a first chemical composition with a first curing time, and a second adhesive having a second chemical composition, distinct from the first chemical composition, with a second curing time, faster than the first curing time; and disposing a second adhesive layer between the battery cells and the first or second shear plate, spaced from the first adhesive layer, and including the first and second adhesives.

For any of the disclosed systems, methods, and vehicles, each of the adhesive layers may include a central adhesive region flanked on opposing lateral sides thereof with first and second side adhesive regions. In this instance, the central region is formed with the primary adhesive whereas the two side regions are formed with the secondary adhesive. Each adhesive layer may also include a center segment that is located at the center of the central region and is formed with the secondary adhesive. Optionally, the adhesive layers' two side regions may abut their respective lateral sides of the central region. For at least some implementations, the adhesive layers may be arranged in a predefined pattern, which may take on non-linear, irregular geometric patterns that extend the length of the housing.

For any of the disclosed systems, methods, and vehicles, the battery cells include opposing top (first) and bottom (second) ends with the initial (first) adhesive layer abutting the top end of the cells. In this instance, the additional (second) adhesive layer is disposed between the cells and top shear plate with the initial adhesive layer sandwiched between the cells and the additional adhesive layer. As another option, an integrated ICB assembly electrically interconnects the battery cells to one another and, for example, to an HV electrical system via a main direct current (DC) bus. In this instance, the initial layer of adhesives may abut a bottom (first) face of the electrical ICB and the additional layer of adhesives may abut a top (second) face of the ICB. The battery assembly may also include a cell holder tray that supports thereon the battery cells, and an optional (third) adhesive layer disposed between and adhering the bottom (second) shear plate to the cell holder tray. The third adhesive layer may include only the primary adhesive or, if desired, both the primary and secondary adhesives. As another option, a polymeric electrical isolation sheet may abut the additional (second) adhesive layer to thereby adhere to the ICB. Another (fourth) adhesive layer may be disposed between and adhere the top (first) shear plate to the isolation sheet. Like the third layer, the fourth adhesive layer may include only the primary adhesive or, if desired, both the primary and secondary adhesives.

For any of the disclosed systems, methods, and vehicles, the initial (first) adhesive layer may abut the top (first) end of the battery cells and the additional (second) adhesive layer may abut the bottom (second) end of the battery cells such that the additional adhesive layer disposed is interposed between the cells and bottom shear plate. In this instance, an electrical ICB assembly may electrically interconnect the battery cells; the ICB assembly is adhered to the battery cells by the initial layer of adhesives. As another option, a cell holder tray may support thereon the battery cells; an optional (third) adhesive layer containing both the primary and secondary adhesives is disposed between and adheres the bottom shear plate and the cell holder tray. Another optional (fourth) adhesive layer containing a polymer foam adhesive may be disposed between and adhere the ICB assembly and the top shear plate.

For any of the disclosed systems, methods, and vehicles, the primary (first) adhesive may be a fire-retardant, medium or high-strength polymer-based structural adhesive, whereas the fixturing (second) adhesive may be a fire-retardant, low-strength polymer-based structural adhesive. In non-limiting examples, the primary adhesive may be a multi-component synthetic polymer polyurethane or acrylic hot-melt or pressure-sensitive adhesive, and the secondary adhesive may be a single-component synthetic polymer moisture-curing urethane adhesive. As another option, the primary adhesive's curing time may be greater than about 10 minutes (mins) (e.g., about 15 to 20 mins), whereas the secondary adhesive's curing time may be less than about 6 mins (e.g., about 2 to 5 mins).

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Figure 1:
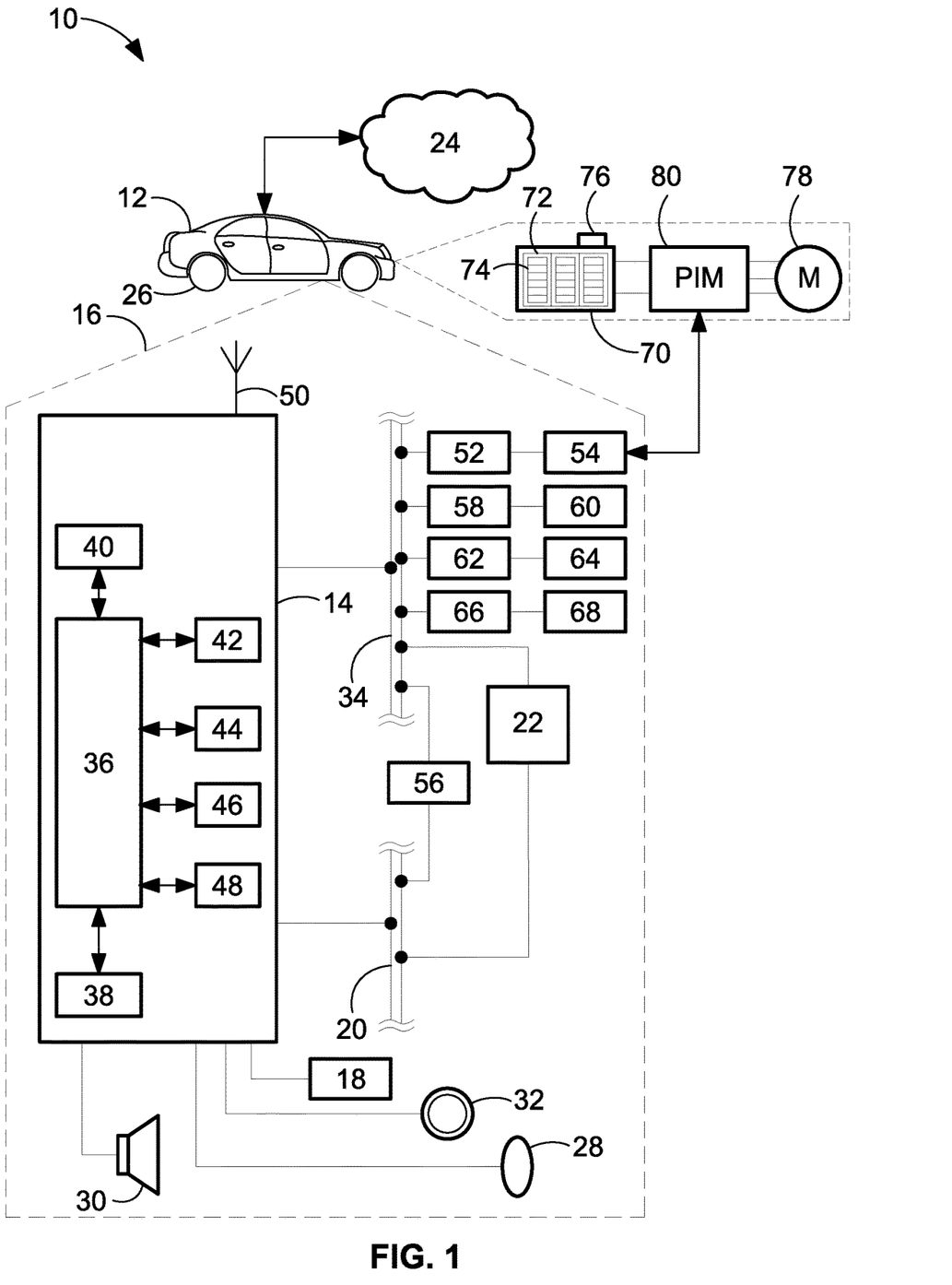
FIG. 1 is a partially schematic, side-view illustration of a representative motor vehicle with an electrified powertrain and a rechargeable traction battery pack containing an array of electrochemical battery cells fixtured with adhesive layers according to aspects of the disclosed concepts.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which aspects of this disclosure may be practiced. In the same vein, incorporation of the present concepts into an FEV powertrain should also be appreciated as a non-limiting implementation of disclosed features. As such, it will be understood that aspects and features of this disclosure may be applied to other powertrain architectures, may be incorporated into any logically relevant type of vehicle, and may be employed for both automotive and non-automotive applications alike. Moreover, only select components of the motor vehicles and the battery systems are shown and described in additional detail herein. Nevertheless, the vehicles and systems discussed below may include numerous additional and alternative features, and other available peripheral components, for carrying out the various methods and functions of this disclosure.

The representative vehicle 10 of FIG. 1 is originally equipped with a vehicle telecommunications and information ("telematics") unit 14 that wirelessly communicates, e.g., via cell towers, mobile switching centers, satellite service, etc., with a remotely located "off-board" cloud computing host service 24 (e.g., ONSTAR®). Some of the other vehicle hardware components 16 shown generally in FIG. 1 include, as non-limiting examples, an electronic video display device 18, a microphone 28, audio speakers 30, and assorted user input controls 32 (e.g., buttons, knobs, switches, touchpads, joysticks, touchscreens, etc.). These hardware components 16 function, in part, as a human/machine interface (HMI) that enables a user to communicate with the telematics unit 14 and other components resident to and remote from the vehicle 10. Microphone 28, for instance, provides occupants with a means to input verbal commands using an embedded voice-processing unit utilizing audio filtering, editing, and analysis modules. Conversely, the speakers 30 provide audible output to a vehicle occupant and may be either a stand-alone speaker dedicated for use with the telematics unit 14 or may be part of an in-cabin audio system 22. The audio system 22 is operatively connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switches, parallel/serial communications buses, local area network (LAN) interfaces, controller area network (CAN) interfaces, and the like. The network connection interface 34 enables the vehicle hardware 16 to send and receive signals with one another and with various systems both onboard and off-board the vehicle body 12. This allows the vehicle 10 to perform assorted vehicle functions, such as modulating powertrain output, activating brake systems, controlling vehicle steering, regulating charge and discharge of a vehicle battery pack, and other automated functions. For instance, telematics unit 14 may exchange signals with a Powertrain Control Module (PCM) 52, an Advanced Driver Assistance System (ADAS) module 54, an Electronic Battery Control Module (EBCM) 56, a battery charging module (BCM) 58, a Brake System Control Module (BSCM) 60, and assorted other vehicle ECUs, such as body control module (BCM), a Steering Control Module (SCM), an engine control module (ECM), a Sensor System Interface Module (SSIM), etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), or a dedicated controller or control module. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC device, a solid-state drive (SSD) memory, a hard-disk drive (HDD) memory, flash memory, semiconductor memory (e.g., various types of RAM or ROM), etc.

Long-range communication (LRC) capabilities with remote, off-board devices may be provided via one or more or all of a cellular chipset/component, a navigation and location chipset/component (e.g., global positioning system (GPS) transceiver), or a wireless internet protocol (IP) modem, all of which are collectively represented at 44. Close-range wireless connectivity may be provided via a short-range communication (SRC) device 46 (e.g., a BLUETOOTH® unit or near field communications (NFC) transceiver), a dedicated short-range communications (DSRC) component 48, and/or a dual antenna 50. These communications devices may provision data exchanges as part of an operator-initiated pairing or a periodic broadcast in a vehicle-to-vehicle (V2V) communication system or a vehicle-to-everything (V2X) communication system, e.g., Vehicle-to-Infrastructure (V2I), Vehicle-to-Pedestrian (V2P), Vehicle-to-Device (V2D), Vehicle-to-Home (V2H), etc.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, e.g., for executing an automated vehicle operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The type, placement, number, and interoperability of the distributed array of in-vehicle sensors may be adapted, singly or collectively, to a given vehicle platform for achieving a desired level of automation and concomitant autonomous vehicle operation.

To propel the motor vehicle 10, an electrified powertrain is operable to generate and deliver tractive torque to one or more of the vehicle's drive wheels 26. The powertrain is generally represented in FIG. 1 by an electric traction motor (M) 78 that is operatively connected to a rechargeable energy storage system (RESS), which is portrayed as a chassis-mounted traction battery pack 70. The traction battery pack 70 is generally composed of one or more battery modules 72 each containing a cluster or stack of battery cells 74, such as lithium-class, zinc-class, nickel-class, or organosilicon-class cells of the pouch, can, or cylindrical type. One or more electric machines, such as traction motor/generator (M) unit(s) 78, draw electrical power from and, optionally, deliver electrical power to the battery pack 70. A power inverter module (PIM) 80 electrically connects the battery pack 70 to the motor(s) 78 and modulates the transfer of electrical current therebetween. Disclosed concepts are similarly applicable to HEV and ICE-based powertrains. The battery pack 70 may be designed such that module management, cell sensing, module-to-module and/or module-to-host communication functionality, etc., is integrated directly into each battery module 72 and performed by an integrated electronics package, such as a wireless-enabled cell monitoring unit (CMU) 76.

Vehicle 10 may be originally equipped with a rigid floor pan (not visible) that extends across the top of the battery pack 70, e.g., to separate the electrochemical cells 74 within the modules 72 from the occupants in the passenger cabin. An underbody skid plate (also not visible) may be mounted underneath the pack 70, e.g., to protect the pack from water, snow, road debris, etc. The floor pan, skid plate, and battery pack 70 may be anchored to a vehicle chassis frame or, alternatively, may be unified with select portions of the vehicle body 12 (e.g., in a unibody frame construction). The pack 70 incorporates structural features for managing dynamic load cases, such as non-harmonic and non-periodic compression and torsion loads, during vehicle impact events. As described below, the battery pack 70 system may implement structural designs with a battery housing that is sandwiched between impact-force attenuating shear plates, which may assist with mounting the pack 70 to the vehicle frame. For instance, a top shear plate may be utilized to form some or all of a passenger compartment floor pan, whereas a bottom shear plate may be utilized to form some or all of an undercarriage skid plate. A shear plate is oftentimes fabricated from high-strength rigid materials with sufficient gauge/cross-sectional area to carry in-plane loads many times larger than the pack's mass, and typically omits surface contours and cutout sections that may create initiation points for buckling during loading.

Figure 2:
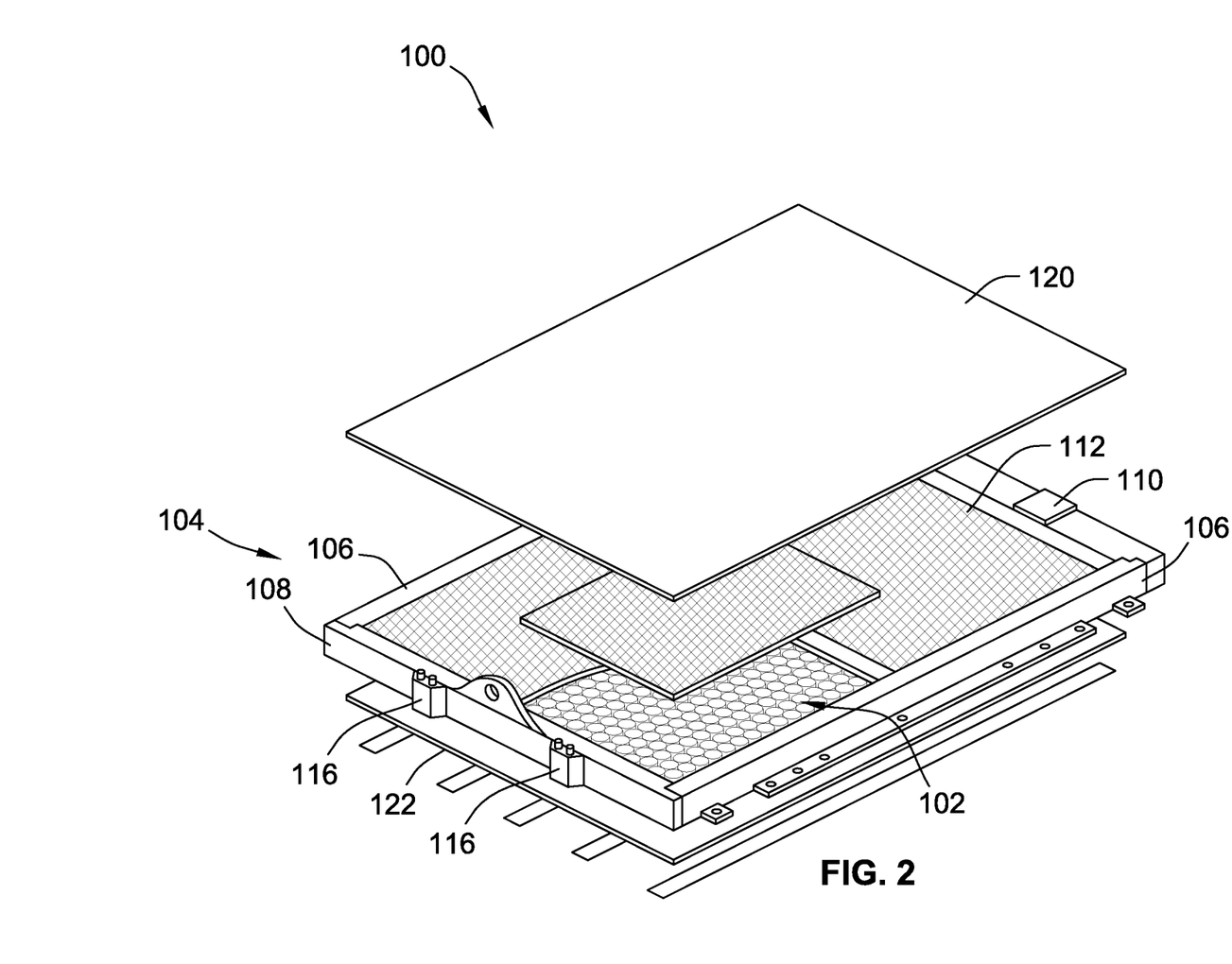
FIG. 2 is a partially exploded, perspective-view illustration of a representative traction battery pack with top and bottom shear plates, an electrical interconnect board, and a cell support tray holding a cluster of cylindrical battery cells, all of which are structurally interconnected by multiple layers of adhesives in accord with aspects of this disclosure.

Turning next to FIG. 2, there is shown a segment of a rechargeable energy storage system (RESS) in the form of a traction battery pack (or "battery assembly") 100 that is adapted for storing and supplying high-voltage electrical energy used, for example, to propel an electric-drive vehicle, such as FEV automobile 10 of FIG. 1. This battery pack 100 may be representative of a deep-cycle, high-ampere capacity vehicle battery system rated for approximately 350 to 800 direct current voltage (VDC) or more, for example, depending on a desired vehicle range, a gross vehicle weight, and the power ratings of the various accessory loads drawing electrical power from the RESS. To this end, the pack 100 may be electrically connectable to an electrical load or an electrical source, or both, such as polyphase permanent magnet (PM) electric machines or other form of electric traction motor (M) 78. Each traction battery pack 100 may incorporate an aggregation of 100's or 1000's of discrete electrochemical cells connected in series and/or parallel to achieve the desired total voltage and total current requirements.

The traction battery pack 100 of FIG. 2 is generally typified by an assemblage of electrochemical battery cells that is contained inside a protective battery housing. In the illustrated example, a staggered cluster of lithium-class battery cells 102 is arranged in a rectangular array and securely stored inside a battery pack housing 104. The housing 104 may be constructed of a metallic, polymeric, or fiber-reinforced polymer (FRP) material, including combinations thereof, to satisfy various mechanical, manufacturing, and thermal design specifications. The battery housing 104 may have a relatively flat and lightweight construction with a hexahedral shape, as shown, or may be constructed in other regular and irregular geometric configurations for accommodating application-specific design and packaging parameters. Likewise, the battery assembly 100 may contain a cluster of staggered lithium-ion cylindrical can cells that share a common housing, as shown, or may contain stacks or individual modules of battery cells, may contain pouch-type cells, prismatic-type cells, or other cell form factor, and/or may employ other suitable battery technologies, such as those described above with respect to the battery cells 74 of FIG. 1.

According to the representative battery assembly configuration of FIG. 2, the battery pack housing 104 (or "battery container") is generally composed of multiple sidewalls that cooperate with optional topside and bottom-side covers (not shown) to collectively encase the battery cells 102. In particular, the pack housing 104 includes a pair of rocker section side rails 106 that are spaced laterally from each other and extend longitudinally along the length of the vehicle chassis. Opposing front and rear ends of each side rail 106 are joined, e.g., via threaded fasteners, to fore and aft bulkhead rails 108 and 110, respectively, which are spaced longitudinally from each other and extend laterally across the width of the vehicle chassis. The two side rails 106 mount the battery pack 100 to rocker sections of a vehicle chassis, whereas the fore and aft bulkhead rails 108, 110 mount the pack 100 to front and rear bulkhead sections of the vehicle chassis.

An integrated electrical interconnect board (ICB) assembly 112 is seated on top of the battery cells 102 of FIG. 2, interposed between a top (first) shear plate 120 and uppermost end of the clustered battery cells 102. The integrated ICB assembly 112 may simultaneously function as an electrically insulating, cell holding, cell sensing, and cell bussing solution that electrically interconnects the battery cells 102 in series or in parallel. Optional ICB hardware may include a flexible integrated circuit (FIC) sensing package (not shown) with an assortment of battery operating sensors, such as voltage, current, and temperature sensing devices. A senseline assembly (not shown) with electrical pads and circuit traces operatively connects the FIC sensing package with select cells or cell groups of the battery pack 100. Bus connectors 116 on the fore/aft rail 108, 110 electrically connect the ICB assembly 112 to the vehicle's high-voltage electrical system.

Providing subjacent support for the battery cells 102 is a cell carrier panel (or "cell holder tray") 114 (FIG. 3), which is interposed between a bottom (second) shear plate 122 and the bottom faces of the battery cells 102. The cell carrier panel 114 may be an eggcrate-like structure that physically buttresses the battery cells 102. If desired, the carrier panel 114 may be formed from a thermally conductive material that facilitates dissipation of cell-generated heat or, alternatively, from a thermally resistive material to prevent heat transfer under a thermal runaway propagation (TRP) event. In addition, the cell carrier panel 114 may provide both a shock-absorbing clearance between the bottom shear plate 122 and the cells 102 and a thermal gap for evacuating from the system hot air and gases that may be generated during a thermal event. An optional thermoplastic composite "doubler" plate (not shown) may be pin-jointed, adhered, fastened, or riveted to a ground-facing underside surface of the bottom shear plate 122 to provide additional protection for the battery pack 100 assembly.

Acting as a physical barrier between the passenger cabin and battery pack 100, a top (first) shear plate 120 is attached onto a top (first) side of the battery pack housing 104 to thereby cover an inboard-facing top surface of the ICB assembly 112. Acting as a protective underbody panel for the chassis and as a protective shield for the underside of the traction battery pack 100, a bottom (second) shear plate 122 is attached onto a bottom (second) side of the housing 104 opposite that of the top shear plate 120 to thereby cover an outboard-facing bottom surface of the cell carrier panel 114. With this arrangement, the two shear plates 120, 122 sandwich therebetween the battery cells 102, e.g., without physically contacting any of the cells 102. In the illustrated example, each shear plate 120, 122 consists essentially of a substantially flat panel sans surface contours, cutout sections, or formed features so as to optimize in-plane load dissipation across the plates 120, 122. The shear plates 120, 122 may each be fabricated, in whole or in part, from a rigid metallic material (e.g., high-strength, low-alloy (HSLA) steel, aluminum/titanium composite, etc.) as a single-piece structure. While not per se required, it may be desired that the two shear plates 120, 122 are substantially structurally identical to each other, e.g., for ease of manufacture and simplicity of design.

Figure 3:
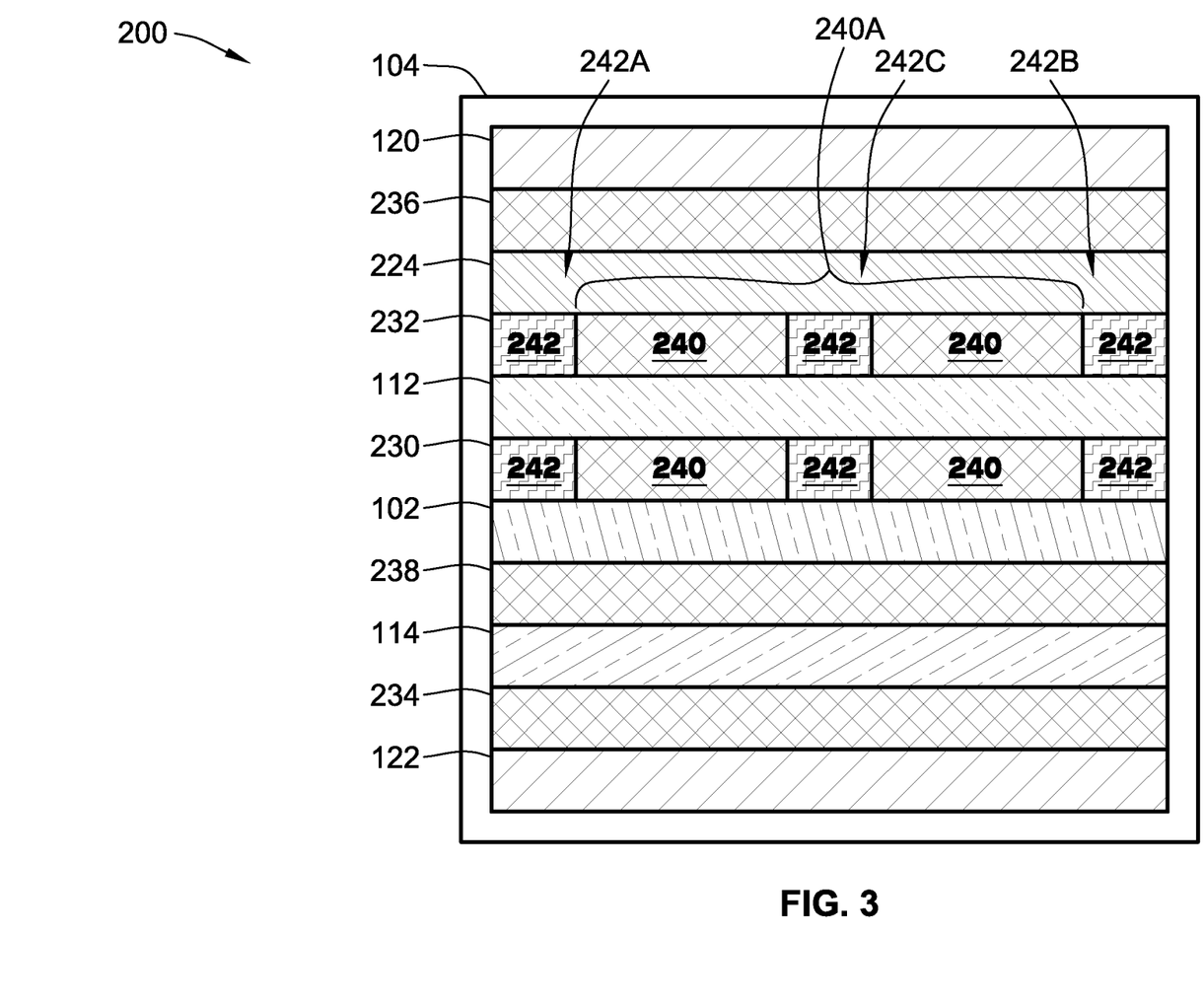
FIG. 3 is a schematic, side-view illustration of a representative battery assembly with a battery cell fixtured inside a battery housing using interposed layers of primary and secondary adhesives in accord with aspects of this disclosure.
Figure 4:
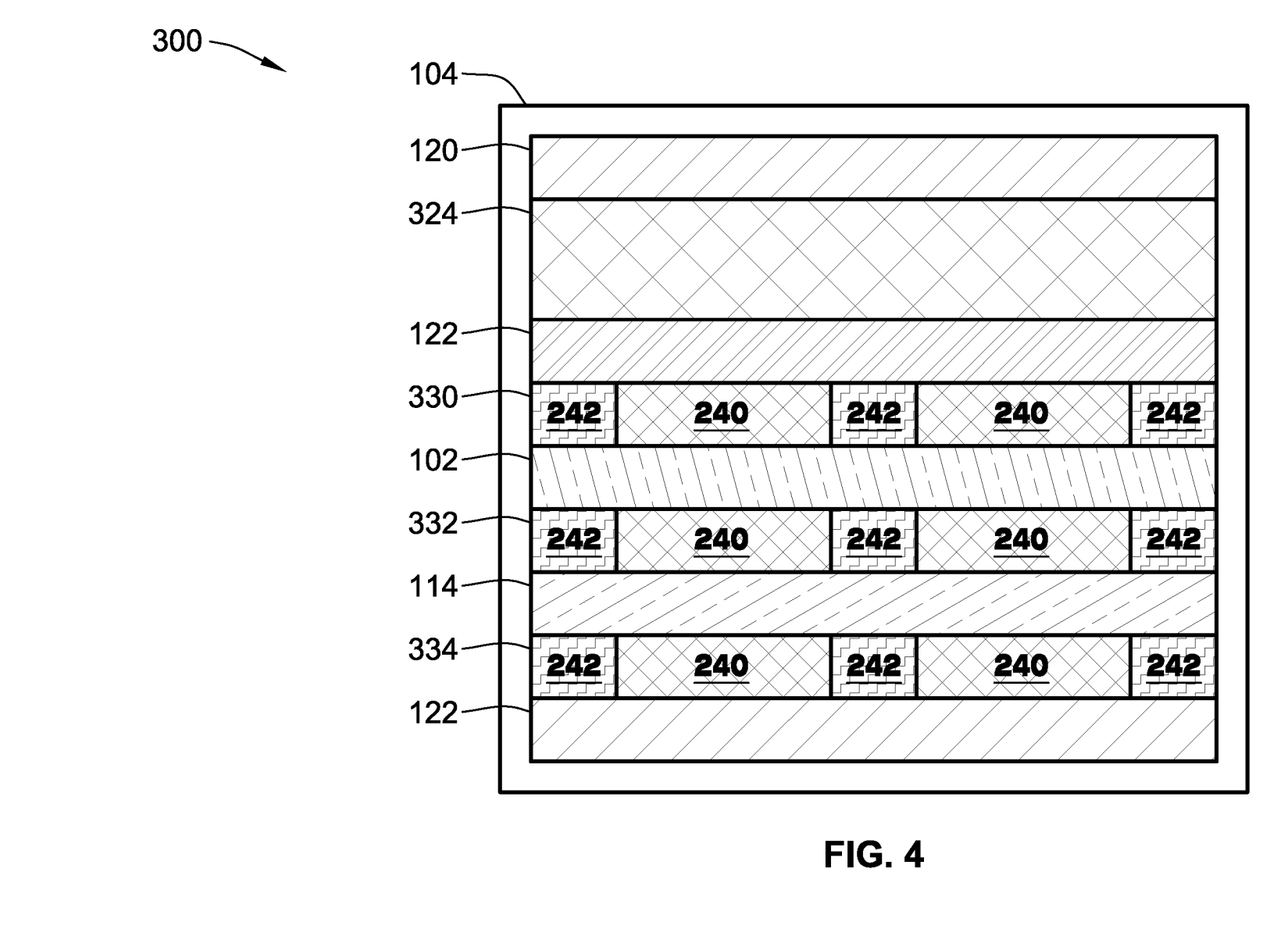
FIG. 4 is a schematic, side-view illustration of another representative battery assembly with a battery cell fixtured inside a battery housing using interposed layers or primary and secondary adhesives in accord with aspects of this disclosure.

Turning next to FIGS. 3 and 4, wherein like reference numbers are used to designate like parts from FIG. 2, there are presented examples of battery assemblies 200 and 300 with one or more battery cells 102 fixtured inside a battery housing 104 using interposed adhesive layers containing a combination of adhesives. Although differing in appearance, it is envisioned that any of the features and options described above with reference to the battery packs 70 and 100 of FIGS. 1 and 2 may be incorporated, singly or in any combination, into the battery assemblies 200 and 300 of FIGS. 3 and 4, and vice versa. As a non-limiting point of similarity, the cell(s) 102 of the battery assemblies 200, 300 are packaged inside a protective and electrically insulated outer battery housing 104, sandwiched between top and bottom shear plates 120 and 122. Moreover, an electrical ICB assembly 112 is seated on top of the battery cell(s) 102, interposed between the top shear plate 120 and the uppermost end of the cell(s) 102. Positive electrical terminals on the top(s) of the cell(s) 102 mate with complementary busbar tabs integrated into the ICB assembly 112. A cell holder tray 114, which may be in the nature of thermal runaway propagation (TRP) tray, seats thereon and retains the battery cell(s) 102. As shown, the cell tray 114 is interposed between the bottom shear plate 122 and the bottom-most end of the cell(s) 102. The cell holder tray 114 provides subjacent support and cell-to-cell spacing for the battery cell(s) 102.

To fixture the cell(s) 102 in place during pack assembly, e.g., aiding in cell alignment and mounting, and to secure the cell(s) 102 in place for pack use, e.g., minimizing cell-borne vibrations and noise, the battery assemblies 200, 300 of FIGS. 3 and 4 interpose multiple layers of adhesives between the electrochemical cells and surrounding internal battery components. In FIG. 3, for example, an initial cell-to-ICB layer of adhesives 230 (first adhesive layer) and an additional ICB-to-insulator layer of adhesives 232 (second adhesive layer) are disposed between the battery cell(s) 102 and the top shear plate 120, with the additional adhesive layer 232 spaced vertically upward from the initial adhesive layer 230. There are also three optional adhesive layers in the battery assembly 200 of FIG. 3: a bottom layer of adhesive 234 (third adhesive layer) that is disposed between the cell(s) 102 and the bottom shear plate 122; a top layer of adhesive 236 (fourth adhesive layer) that is disposed between an electrical isolation sheet 224 and the top shear plate 120; and an intermediate layer of adhesive 238 (fifth adhesive layer) that is disposed between the cell(s) 102 and the tray 114. With this arrangement, the battery components inside the battery housing 104 of FIG. 3 are stacked from top-to-bottom as follows: top shear plate 120, fourth adhesive layer 236, isolation sheet 224, second adhesive layer 232, ICB assembly 112, first adhesive layer 230, cell(s) 102, fifth adhesive layer 238, cell tray 114, third adhesive layer 234, and bottom shear plate 122. While shown with five layers of adhesives, the battery assembly may comprise greater or fewer adhesive layers or may be arranged in a different order than what is shown (see, e.g., FIG. 4). Moreover, there may be additional components interleaved between or integrated with the illustrated layers.

FIG. 4 presents optional and alternative battery components and stack-up arrangements for any of the disclosed battery assemblies. In this example, a cell-to-ICB layer of adhesives 330 (first adhesive layer) is disposed between the battery cell(s) 102 and the top shear plate 120, and a cell-to-tray layer of adhesives 332 (second adhesive layer) is disposed between the battery cell(s) 102 and the bottom shear plate 122, with the additional adhesive layer 232 spaced vertically downward from the initial adhesive layer 230. An optional bottom layer of adhesive 334 (third adhesive layer) is disposed between the cell holder tray 114 and the bottom shear plate 122. With this arrangement, the battery components inside the battery housing 104 of FIG. 4 are stacked from top-to-bottom as follows: top shear plate 120, insulating foam adhesive layer 324, ICB assembly 112, first adhesive layer 330, battery cell(s) 102, second adhesive layer 332, cell tray 114, third adhesive layer 334, and bottom shear plate 122. As used herein, the term "layer" is inclusive of but does not per se require that a particular segment of the composite construction be a continuous sheet or otherwise span the entirety of all remaining layers.

To fixture the battery cell(s) 102 in operative alignment with their neighboring components, one or more of the aforementioned adhesive layers contains both fast-setting and slow-curing adhesives. Both the first and second adhesive layers 230, 330, 232, 332 of FIGS. 3 and 4, for example, may each contain a primary (first) adhesive 240 having a distinct (first) chemical composition with a relatively slow curing time, and a fixturing (second) adhesive 242 having a distinct (second) chemical composition with a relatively fast curing time. By way of comparison, the optional third, fourth and fifth adhesive layers 234, 236, 238 of FIG. 3 may contain or consist essentially of a single adhesive (e.g., primary adhesive 240), whereas the third adhesive layer 334 of FIG. 4 may contain both the primary and secondary adhesives 240, 242. It is envisioned that the optional adhesive layers 234, 236, 238 of FIG. 3 may contain multiple types of adhesives (e.g., both the primary and secondary adhesives 240, 242) and the optional adhesive layer 334 of FIG. 4 may contain only a single adhesive. In the same vein, any of the illustrated adhesive layers may contain additional and alternative types of adhesives, additives, fillers, modifiers, etc.

The primary adhesive 240 is chemically configured to fixedly secure the battery cell(s) 102 in place for day-to-day use of the battery assembly 200. To this end, the primary adhesive 240 may be a fire-retardant, medium-strength or high-strength (at least about 10 megapascal (MPa) shear strength) polymer-based structural adhesive. By comparison, the secondary adhesive 242 is chemically configured to fixture the cell(s) 102 in place during construction of the battery assembly 200. To this end, the secondary adhesive 242 may be a fire-retardant, low-strength (between about 2-5 MPa shear strength) polymer-based structural adhesive. As used herein, the term "structural adhesive" may be defined to include metal-to-polymer and polymer-to-polymer adhesives that bond together components in load-bearing structures and have a lap shear strength of at least about 2 MPa (e.g., 6.5+ MPa) and a T-peel strength (e.g., ASTM D1876)

of at least about 0.5 Newtons per millimeter (N/mm) (e.g., 6.8+ N/mm) after exposure to room temperature. In some specific, yet non-limiting examples, the primary adhesive 240 may be a multi-component, synthetic-polymer polyurethane or acrylic adhesive with a slow-curing time that is greater than about 10 minutes (e.g., about 15-20 mins), whereas the secondary adhesive 242 may be a single-component, synthetic-polymer moisture-curing urethane adhesive with a fast-curing time of less than about 6 minutes (e.g., about 2-5 mins). The foam adhesive layer 324, in contrast, may be a multi-component, synthetic-polymer high strength-to-density ratio epoxy-based foaming adhesive. In a specific, yet non-limiting example, the foam adhesive layer 324 may be a low-density (e.g., less than about 1 g/cc), high-expansion rate (e.g., greater than 100%), low strength structural adhesive (>5 MPa)

To help fixture the internal battery components in place while the primary structural adhesive cures, the adhesive layers 230, 232, 330, 332, 334 of FIGS. 3 and 4 each combines fast-set and slow-cure adhesives into a single layer (i.e., in a shared, single plane as opposed to layered one on top of the other) to ensure both adhesives directly contact the neighboring components being joined together. By way of example, and not limitation, each layer of adhesives 230, 232, 330, 332, 234 may be formed with multiple distinct adhesive regions, including a central adhesive region 240A that is flanked on opposing left and right lateral sides thereof by left-side and right-side adhesive regions 242A and 242B, respectively. An optional center adhesive segment 242C may be located at the center of the central adhesive region 240A. In this example, the center segment 242C may be surrounded by and/or enclosed within the central region 240A, and the central region 240A may be surrounded by and/or sandwiched between the left and right regions 242A, 242B. In the same vein, the side regions 242A, 242B may each directly contact a respective lateral side of the central region 240A, and the central region 240A may directly contact both lateral sides of the center segment 242C. In this example, the central region 240A may be formed, substantially or entirely, from the primary adhesive 240, whereas the side regions 242A, 242B and center segment 242C may be formed, substantially or entirely, from the secondary adhesive 242. It is envisioned that each adhesive layer 230, 232, 330, 332, 234 contain greater or fewer regions than what are shown in the drawings (e.g., only a single primary adhesive region and only a single secondary adhesive region).

With reference again to the battery assembly 200 of FIG. 3, the initial (first) layer of adhesives 230 sits on top of and abuts the top end of the battery cell(s) 102, sandwiched between and adhering together the cell(s) 102 and the ICB assembly 112. The additional (second) adhesive layer 232 sits on top of and abuts the ICB assembly 112, sandwiched between and adhering together the ICB assembly 112 and the isolation sheet 224. With this arrangement, the first adhesive layer 230 directly contacts a bottom (first) face of the electrical ICB assembly 112, whereas the second adhesive layer 232 directly contacts a top (second) face of the ICB assembly 112. The optional third adhesive layer 234 of FIG. 3 is disposed between, directly physically contacts, and thereby adheres together the bottom shear plate 122 and the cell holder tray 114. The optional fourth adhesive layer 236 is disposed between, directly physically contacts, and thereby adheres together the top shear plate 120 and the electrical isolation sheet 224, which may be a polymer-based dielectric barrier that isolates the ICB 112 from the top shear plate 120. Lastly, the optional fifth adhesive layer 238 is disposed between, directly physically contacts, and thereby adheres together the cell(s) 102 and cell tray 114.

Turning again to FIG. 4, the first layer of adhesives 330 sits on top of and abuts the top end of the battery cell(s) 102, whereas the second layer of adhesives 332 sits underneath and abuts the bottom end of the battery cell(s) 102 such that the battery cell(s) 102 are sandwiched between the two multi-adhesive layers 330, 332. In this stack-up arrangement, the first adhesive layer 330 directly contacts and thereby adheres together the electrical ICB assembly 112 and battery cell(s) 102, whereas the second adhesive layer 332 directly contacts and thereby adheres together battery cell tray 114 and cell(s) 102. The third adhesive layer 334, in contrast, is disposed between, directly physically contacts, and thereby adheres together the bottom shear plate 122 and the holder tray 114. The optional fourth adhesive layer 324 is disposed between, directly physically contacts, and thereby adheres together the electrical ICB assembly 112 and the top shear plate 120, e.g., to electrically isolate the ICB 112 from the top shear plate 120.

A total surface area of each layer of adhesives (the "adhesive joint") on the ICB 112 and/or cell holder 114 may be a function of both the adhesive dispense pattern and each adhesive material's wet out characteristic when dispensed. Both the adhesive material and the dispense path may be optimized to ensure there is a sufficient amount of adhesive surface area at the different interfaces to carry a predicted or predefined minimum load in the battery assembly. The fixture adhesive may need to be dispensed in a predefined pattern that ensures it pulls warpage from the mating parts. For example, if a battery component has warpage in a first direction, the fixture adhesive may be dispensed in a pattern parallel to the warpage to allow for a flatter profile on parts for the next manufacturing process. A total volume ratio of primary structural adhesive to secondary fixturing adhesive may be optimized to meet manufacturing parameters and constraints. The fast-set secondary adhesive may be chosen based on its ability to cure quickly and carry the residual stresses during manufacturing. The volume ratio may be calculated to balance sufficient strength to overcome temporary manufacturing loads and predicted loads that will likely be seen during battery assembly operation.

Disclosed concepts are also directed to manufacturing systems and processes for fabricating fixture aids for adhesives. For many battery system architectures, structural adhesive joints need to be fixtured until they achieve "green" strength. A fixture aid may be created in accord with disclosed concepts to press the adhesive joint together until it reaches a predefined minimum engineered green strength at which point the fixture aid may be removed. To this end, a secondary adhesive's shorter cure time allows the system to be under compression for a shorter duration while the primary adhesive is curing. A purpose of fast-setting secondary fixture adhesive is to minimize the fixturing time or press time for initial green strength bonding. For instance, a clamp fixturing process may flatten joint components and compress the adhesive joint together until a fixture set adhesive reaches the engineered green strength at which point the fixture aid may be removed. Without using the fixture set adhesive, the clamp fixturing may need to be maintained much longer until the primary adhesive has time to achieve green strength. If released before achieving green strength, the components being bonded may spring back to a warped shape and, thus, may deteriorate bond strength and not achieve height or flatness specifications.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A battery assembly, comprising:
a battery housing;
a plurality of battery cells disposed in the battery housing;
first and second shear plates attached to opposing first and second housing sides, respectively, of the battery housing and sandwiching therebetween the battery cells;
a first adhesive layer disposed between the battery cells and the first shear plate, the first adhesive layer including a first adhesive having a first chemical composition with a first curing time, and a second adhesive having a second chemical composition, distinct from the first chemical composition, with a second curing time, faster than the first curing time; and
a second adhesive layer disposed between the battery cells and the first or second shear plate, spaced from the first adhesive layer, and including the first and second adhesives.

2. The battery assembly of claim 1, wherein the first and second adhesive layers each includes a central region and first and second side regions disposed on opposing first and second lateral sides, respectively, of the central region, the central region is defined by the first adhesive, and the first and second side regions are defined by the second adhesive.

3. The battery assembly of claim 2, wherein the first and second adhesive layers each further includes a center segment located at the center of the central region and defined by the second adhesive.

4. The battery assembly of claim 2, wherein the first and second side regions abut the first and second lateral sides, respectively, of the central region.

5. The battery assembly of claim 1, wherein the battery cells include opposing first and second ends, the first adhesive layer abutting the first end of the battery cells, and the second adhesive layer disposed between the battery cells and the first shear plate with the first adhesive layer sandwiched between the battery cells and the second adhesive layer.

6. The battery assembly of claim 1, further comprising an electrical interconnect board (ICB) electrically interconnecting the battery cells, the first adhesive layer abutting a first face of the electrical ICB, and the second adhesive layer abutting a second face, opposite the first face, of the electrical ICB.

7. The battery assembly of claim 6, further comprising:
a cell holder tray supporting thereon the battery cells; and
a third adhesive layer disposed between and adhering the second shear plate and the cell holder tray, the third adhesive layer including the first adhesive.

8. The battery assembly of claim 7, further comprising:
an electrical isolation sheet abutting the second adhesive layer; and
a fourth adhesive layer disposed between and adhering the first shear plate and the electrical isolation sheet, the fourth adhesive layer including the first adhesive.

9. The battery assembly of claim 1, wherein the battery cells include opposing first and second ends, the first adhesive layer abutting the first end of the battery cells, and the second adhesive layer abutting the second end of the battery cells with the second adhesive layer disposed between the battery cells and the second shear plate.

10. The battery assembly of claim 9, further comprising an electrical interconnect board (ICB) electrically interconnecting the battery cells, the first adhesive layer abutting a first face of the electrical ICB.

11. The battery assembly of claim 10, further comprising:
a cell holder tray supporting thereon the battery cells; and
a third adhesive layer disposed between and adhering the second shear plate and the cell holder tray, the third adhesive layer including the first and second adhesives.

12. The battery assembly of claim 11, further comprising a fourth adhesive layer including a polymer foam adhesive disposed between and adhering the electrical ICB and the first shear plate.

13. The battery assembly of claim 1, wherein the first adhesive is a fire-retardant medium-strength or high-strength polymer-based structural adhesive, and the second adhesive is a fire-retardant low-strength polymer-based structural adhesive.

14. The battery assembly of claim 1, wherein the first curing time is at least about 10 minutes and the second curing time is less than about 6 minutes.

15. A motor vehicle, comprising:
a vehicle body with a passenger compartment;
a plurality of road wheels attached to the vehicle body;
a traction motor attached to the vehicle body and operable to drive one or more of the road wheels to thereby propel the motor vehicle; and
a traction battery pack attached to the vehicle body and electrically connected to the traction motor, the traction battery pack including:
a battery housing;
a plurality of cylindrical lithium-class battery cells disposed in the battery housing;
top and bottom rigid shear plates attached to opposing top and bottom housing sides, respectively, of the battery housing and sandwiching therebetween the battery cells;
an electrical interconnect board (ICB) disposed in the battery housing proximal the top rigid shear plate and electrically interconnecting the battery cells;
a cell holder tray disposed in the battery housing proximal the bottom rigid shear plate and supporting thereon the battery cells;
a first adhesive layer abutting the battery cells and disposed between the battery cells and the top rigid shear plate, the first adhesive layer including both a first adhesive having a first chemical composition with a first curing time, and a second adhesive having a second chemical composition, distinct from the first chemical composition, with a second curing time, faster than the first curing time; and
a second adhesive layer disposed between the battery cells and the top or bottom rigid shear plate, spaced from the first adhesive layer, and including both the first and second adhesives.

16. A method of constructing a battery assembly, the method comprising:
receiving a battery housing;
placing a plurality of battery cells inside the battery housing;
attaching first and second shear plates to opposing first and second housing sides, respectively, of the battery housing such that the first and second shear plates sandwich therebetween the battery cells;

disposing a first adhesive layer between the battery cells and the first shear plate, the first adhesive layer including a first adhesive having a first chemical composition with a first curing time, and a second adhesive having a second chemical composition, distinct from the first chemical composition, with a second curing time, faster than the first curing time; and disposing a second adhesive layer between the battery cells and the first or second shear plate, spaced from the first adhesive layer, and including the first and second adhesives.

17. The method of claim 16, wherein disposing the first adhesive layer and disposing the second adhesive layer include forming for each of the first and second adhesive layers a central region and first and second side regions disposed on opposing first and second lateral sides, respectively, of the central region, the central region is defined by the first adhesive, and the first and second side regions are defined by the second adhesive.

18. The method of claim 17, wherein the first and second adhesive layers each further includes a center segment located at the center of the central region and defined by the second adhesive.

19. The method of claim 16, wherein the battery cells include opposing first and second ends, the first adhesive layer is disposed abutting the first end of the battery cells, and the second adhesive layer is disposed between the battery cells and the first shear plate with the first adhesive layer sandwiched between the battery cells and the second adhesive layer.

20. The method of claim 16, further comprising:

electrically interconnecting the battery cells to an electrical interconnect board (ICB);

disposing the first adhesive layer abutting a first face of the electrical ICB; and disposing the second adhesive layer abutting a second face, opposite the first face, of the electrical ICB.

* * * * *